United States Patent
Robinson

(10) Patent No.: US 11,479,098 B2
(45) Date of Patent: Oct. 25, 2022

(54) INFLATABLE GATE SEAL ASSEMBLY

(71) Applicant: George Robinson, Youngstown, OH (US)

(72) Inventor: George Robinson, Youngstown, OH (US)

( * ) Notice: Subject to any disclaimer, the term of this patent is extended or adjusted under 35 U.S.C. 154(b) by 495 days.

(21) Appl. No.: 16/670,248

(22) Filed: Oct. 31, 2019

(65) Prior Publication Data
US 2021/0129647 A1 May 6, 2021

(51) Int. Cl.
*B60J 10/244* (2016.01)
*B60J 10/80* (2016.01)
(Continued)

(52) U.S. Cl.
CPC ............. *B60J 10/244* (2016.02); *B60J 10/80* (2016.02); *B60R 13/01* (2013.01); *B60J 5/108* (2013.01);
(Continued)

(58) Field of Classification Search
CPC ... B60J 10/00; B60J 10/45; B60J 10/80; B60J 10/84; B60J 10/86; B60J 10/244; B60J 5/108; B60R 13/01; B60R 13/06; B60P 1/00; B60P 1/283; B62D 63/04; B62D 33/023; B62D 33/027; B62D 33/0273; E06B 7/22; E06B 7/2318; Y10S 277/921
USPC ........ 220/232; 277/583, 605, 645, 656, 921; 296/39.1, 56, 107.4, 146.8, 146.9; 298/1 R, 23 R; 49/477.1
See application file for complete search history.

(56) References Cited

U.S. PATENT DOCUMENTS 3,424,222 A * 1/1969 Caulkins ............... F25D 23/087
160/40
4,020,607 A * 5/1977 Bjervig ................ B65G 69/008
52/2.13
(Continued)

FOREIGN PATENT DOCUMENTS

CN    110239634 A  *  9/2019  ............ B60J 10/244
CN    210554125 U  *  5/2020  .............. B60J 10/84
(Continued)

OTHER PUBLICATIONS

Hu et al., "Transport vehicle and movable door assembly thereof", Sep. 17, 2019, Edition: CN110239634A (Year: 2019).*
(Continued)

*Primary Examiner* — Dennis H Redder
*Assistant Examiner* — Joyce Eileen Hill

(57) ABSTRACT

An inflatable gate seal assembly includes a dump box that is mountable on a dump truck for carrying and dumping a load. A gate is hingedly coupled to the dump box for opening and closing the dump box. A conduit is integrated into the dump box and the conduit is fluidly coupled to an air compressor of the dump truck to receive compressed air from the air compressor. A control is positioned in a cab of the dump truck and the control is in electrical communication with the air compressor. A balloon is coupled to the dump box and the balloon is in fluid communication with the conduit. The balloon is inflated when the control is put in an on condition. Thus, the balloon engages the gate when the balloon is inflated and the gate is in the closed position to inhibit debris from passing between the dump box and the gate.

5 Claims, 4 Drawing Sheets

(51) Int. Cl.
- *B60J 10/84* (2016.01)
- *B60J 10/86* (2016.01)
- *B60R 13/01* (2006.01)
- *B60R 13/06* (2006.01)
- *B60J 5/10* (2006.01)
- *B62D 33/023* (2006.01)
- *B62D 33/027* (2006.01)
- *E06B 7/23* (2006.01)

(52) U.S. Cl.
CPC ............ *B60J 10/84* (2016.02); *B60J 10/86* (2016.02); *B60R 13/06* (2013.01); *B62D 33/023* (2013.01); *B62D 33/027* (2013.01); *B62D 33/0273* (2013.01); *E06B 7/2318* (2013.01)

(56) References Cited

U.S. PATENT DOCUMENTS

| | | |
|---|---|---|
| 4,751,395 A | 6/1988 | Centofanti |
| 4,923,074 A * | 5/1990 | Johnston ............... B60J 10/244 |
| | | 220/232 |
| 5,141,280 A | 8/1992 | Gerrard |
| 6,474,654 B1 | 11/2002 | Schmeichel |
| 7,178,810 B1 * | 2/2007 | Kuhary ................. F16J 15/061 |
| | | 277/921 |
| 7,731,297 B1 | 6/2010 | Ozanich |
| 2002/0017529 A1* | 2/2002 | Kruzick ............... B65F 1/1615 |
| | | 220/908 |
| 2009/0108610 A1 | 4/2009 | Dormaier |
| 2015/0068686 A1* | 3/2015 | Hindman ............. E06B 7/2318 |
| | | 160/40 |
| 2015/0210374 A1* | 7/2015 | Poppe ................... B64C 1/1461 |
| | | 49/477.1 |

FOREIGN PATENT DOCUMENTS

| | | | | |
|---|---|---|---|---|
| GB | 2565109 A | * | 2/2019 | ............ B60J 10/244 |
| WO | WO-9014488 A | * | 11/1990 | ........... E06B 7/2318 |

OTHER PUBLICATIONS

Lu et al., "Slag transport vehicle container tail door with airbag seal", May 19, 2020, Edition: CN210554125U (Year: 2020).*

* cited by examiner

INFLATABLE GATE SEAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to seal devices and more particularly pertains to a new seal device for forming a fluid impermeable seal between a dump box on a dump truck and a gate on the dump box.

(2) Description of Related Art Including Information Disclosed Under 37 CFR 1.97 and 1.98

The prior art relates to seal devices.

BRIEF SUMMARY OF THE INVENTION

An embodiment of the disclosure meets the needs presented above by generally comprising a dump box that is mountable on a dump truck for carrying and dumping a load. A gate is hingedly coupled to the dump box for opening and closing the dump box. A conduit is integrated into the dump box and the conduit is fluidly coupled to an air compressor of the dump truck to receive compressed air from the air compressor. A control is positioned in a cab of the dump truck and the control is in electrical communication with the air compressor. A balloon is coupled to the dump box and the balloon is in fluid communication with the conduit. The balloon is inflated when the control is put in an on condition. Thus, the balloon engages the gate when the balloon is inflated and the gate is in the closed position to inhibit debris from passing between the dump box and the gate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
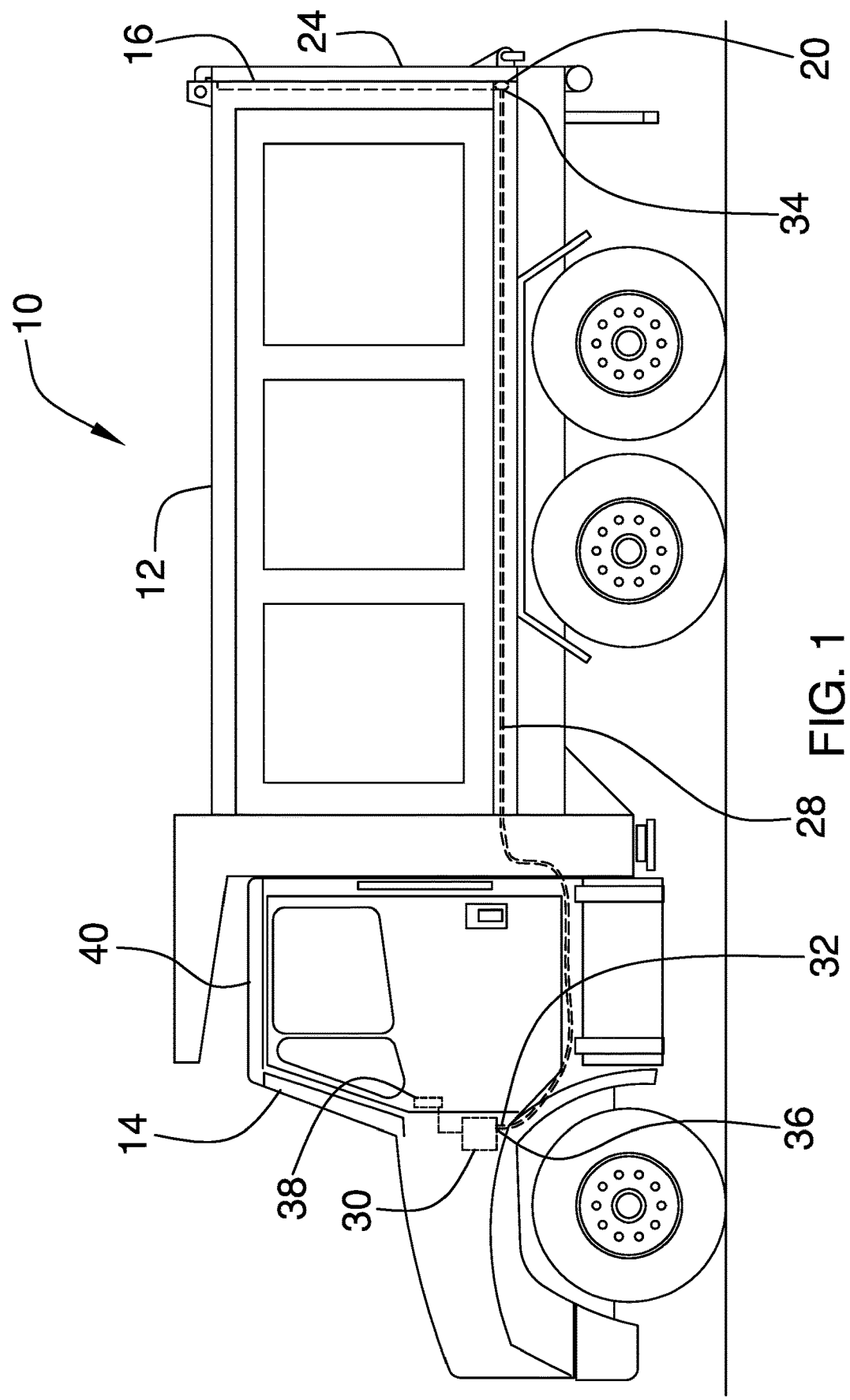
FIG. 1 is a phantom perspective view of an inflatable gate seal assembly according to an embodiment of the disclosure.
Figure 2:
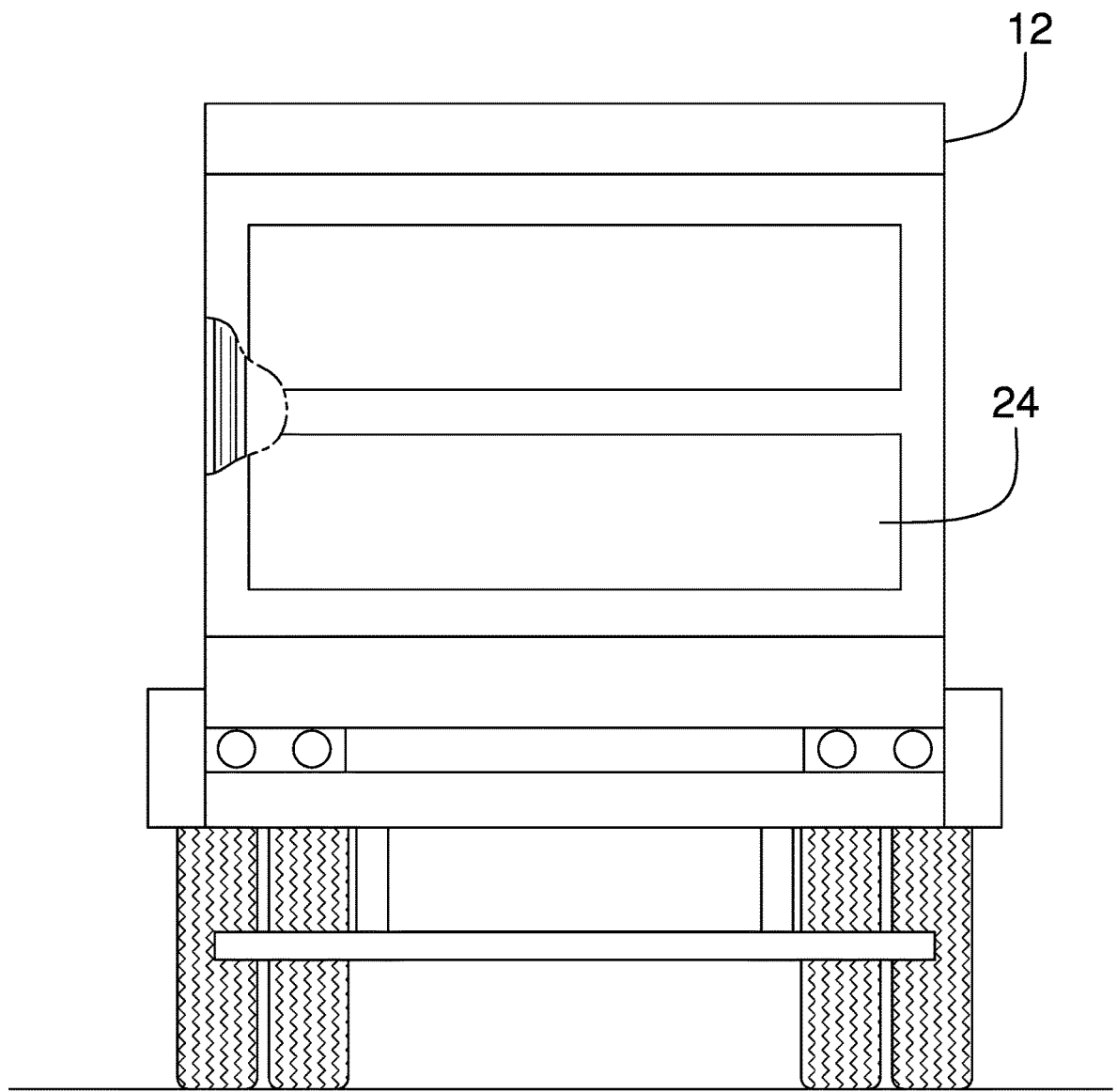
FIG. 2 is a back cut-away view of an embodiment of the disclosure.
Figure 3:
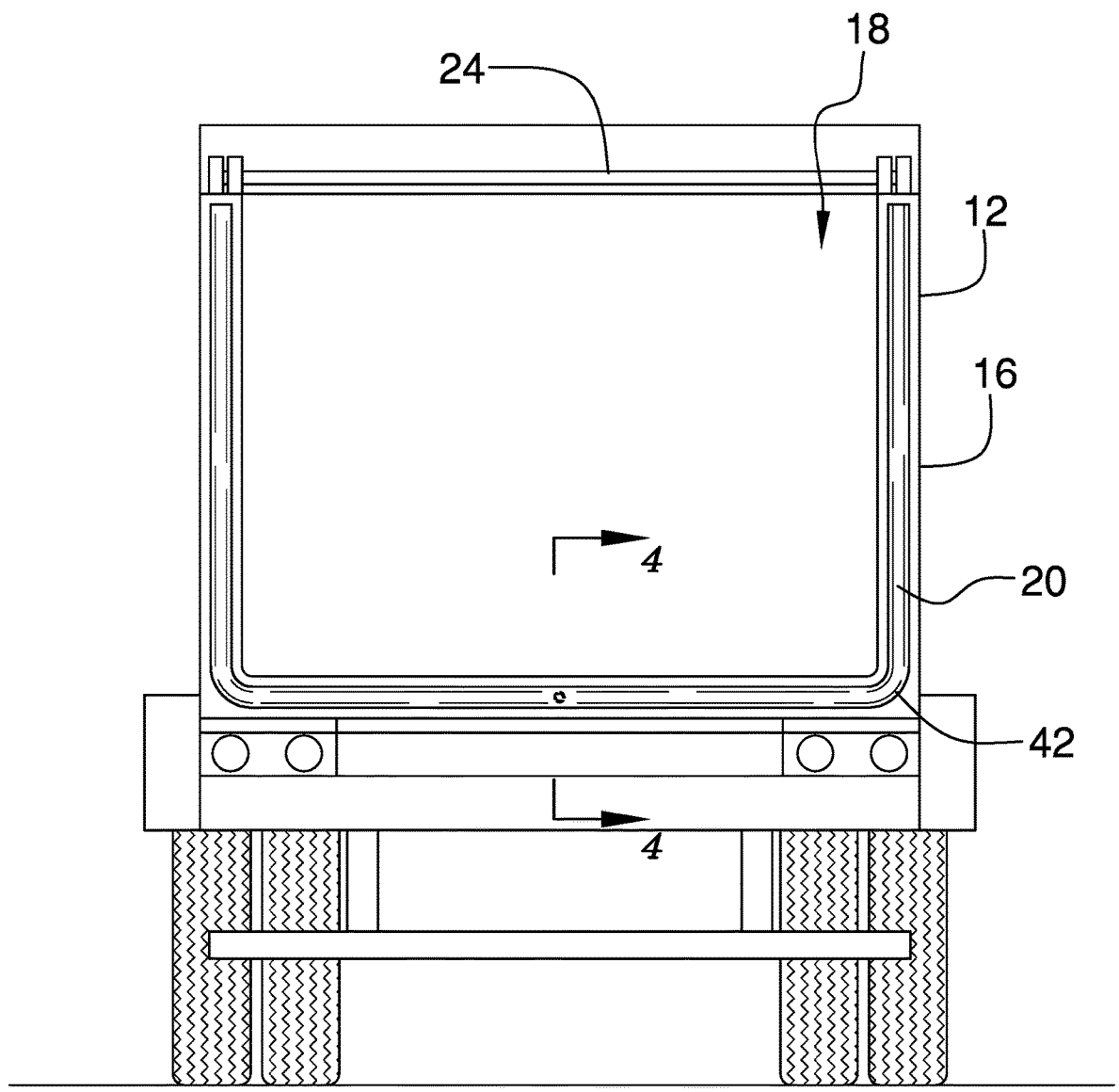
FIG. 3 is a back view of an embodiment of the disclosure showing a gate in an open position.
Figure 4:
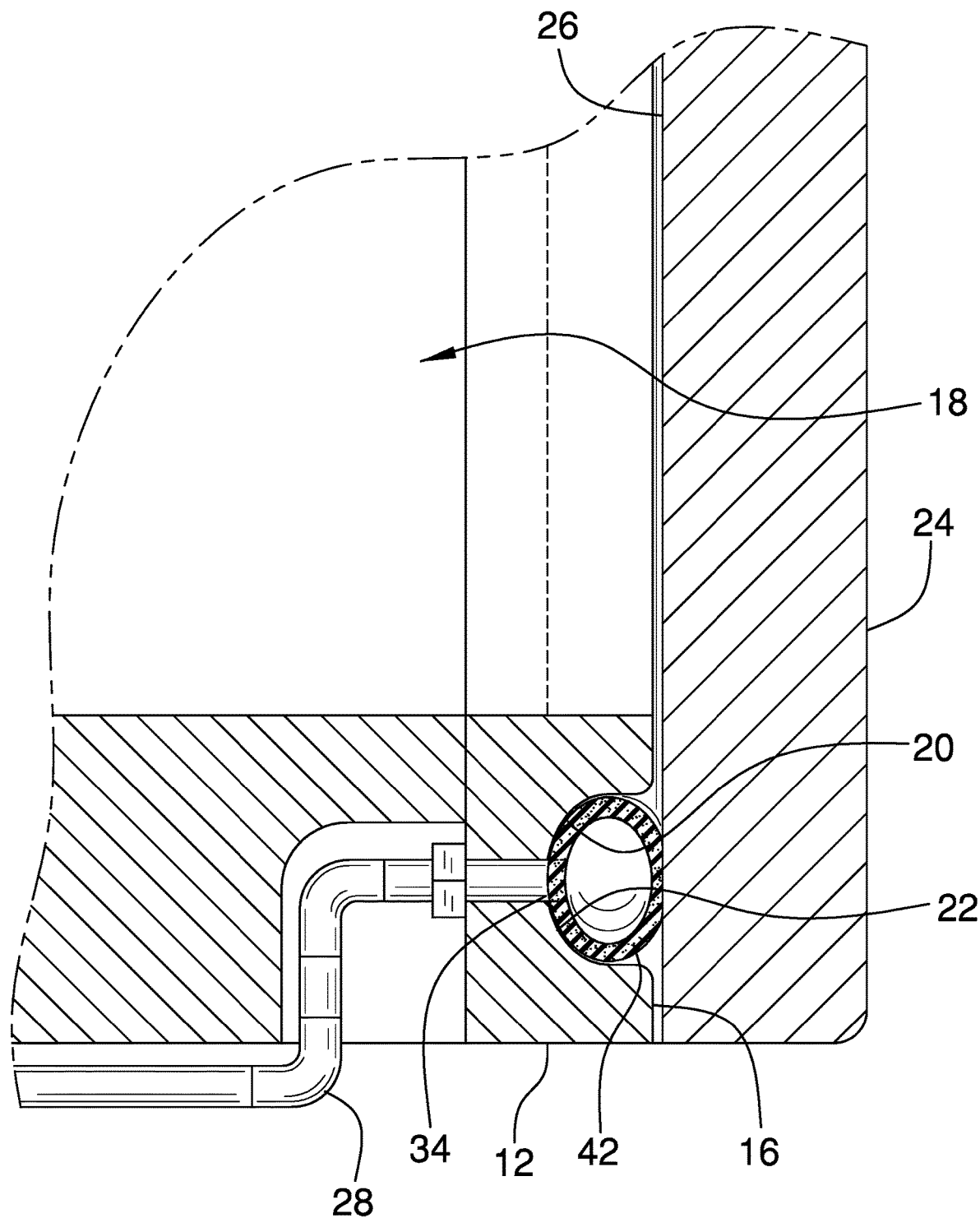
FIG. 4 is a cross sectional view taken along line 4-4 of FIG. 3 of an embodiment of the disclosure.

With reference now to the drawings, and in particular to FIGS. 1 through 4 thereof, a new seal device embodying the principles and concepts of an embodiment of the disclosure and generally designated by the reference numeral 10 will be described.

As best illustrated in FIGS. 1 through 4, the inflatable gate seal assembly 10 generally comprises a dump box 12 that is mountable on a dump truck 14 for carrying and dumping a load. The dump truck 14 may be a dump truck 14 of any conventional design and the dump box 12 may be manufactured in a variety of capacities. The dump box 12 has a rear edge 16 defining an opening 18 into the dump box 12 and the rear edge 16 has a channel 20 integrated therein. The channel 20 extends around an entire perimeter of the opening 18 defined by the rear edge 16. The channel 20 has a bounding surface 22 and the bounding surface 22 is concavely arcuate with respect to the rear edge 16.

A gate 24 is hingedly coupled to the dump box 12. The gate 24 closes the dump box 12 when the gate 24 is positioned in a closed position. The gate 24 opens the dump box 12 when the gate 24 is in an open position. The gate 24 has a first surface 26 and the first surface 26 abuts the rear edge 16 of the dump box 12 when the gate 24 is in the closed position. Additionally, the first surface 26 is spaced from the rear edge 16 when the gate 24 is in the open position.

A conduit 28 is integrated into the dump box 12. The conduit 28 is fluidly coupled to an air compressor 30 of the dump truck 14 to receive compressed air from the air compressor 30. The air compressor 30 may be the factory installed air compressor that supplies compressed air for air brakes on the dump truck 14. The conduit 28 has a first end 32 and a second end 34. The first end 32 is fluidly coupled to an outlet 36 of the air compressor 30 and the second end 34 is positioned in the channel 20.

A control 38 is positioned in a cab 40 of the dump truck 14 such that the control 38 is accessible to a driver. The control 38 is in electrical communication with the air compressor 30. The control 38 actuates the air compressor 30 to release compressed air into the conduit 28 when the control 38 is put into an on condition. Additionally, the control 38 inhibits the air compressor 30 from releasing compressed air into the conduit 28 when the control 38 is put into an off condition. Moreover, the control 38 facilitates air to escape the conduit 28 when the control 38 is put in the off condition. The control 38 may include a control box that is positioned in the cab 40 and the control 38 may include an air valve that is fluidly coupled to the conduit 28. The air valve may be an electrically controlled air valve that passes air in a first direction when the control 38 is put in the on condition, or a second direction when the control 38 is put in the off condition.

A balloon 42 is coupled to the dump box 12 and the balloon 42 is in fluid communication with the conduit 28. The balloon 42 is inflated when the control 38 is put in the on condition. Moreover, the balloon 42 engages the gate 24 when the balloon 42 is inflated and the gate 24 is in the closed position. In this way the balloon 42 inhibits debris from passing between the dump box 12 and the gate 24 when the gate 24 is in the closed position.

The balloon 42 is positioned in the channel 20 and the balloon 42 is coextensive with the channel 20. The balloon 42 is fluidly coupled to the second end 34 of the conduit 28 for inflating the balloon 42 with the compressed air supplied by the air compressor 30. Additionally, the balloon 42 engages the first surface 26 of the gate 24 when the balloon 42 is inflated and the gate 24 is in the closed position. The balloon 42 may be comprised of a puncture resistant material such that the balloon 42 resists being damaged by the gate 24 or by the debris.

In use, the control 38 is put into the on condition when the dump box 12 has been lowered and the gate 24 is in the closed position. Thus, the balloon 42 inflates to seal the gap between the first surface 26 of the gate 24 and the rear edge 16 of the dump box 12. In this way debris or material that is being transported in the dump box 12 is inhibited from falling between the dump box 12 and the gate 24. The control 38 is put into the off condition when the dump box 12 is being lifted for dumping the debris or material from the dumb box.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An inflatable gate seal assembly being configured to seal a gate of a dump box on a dump truck when the gate is closed fir inhibiting debris from exiting the dump box, said assembly comprising:

a dump box being mountable on a dump truck for carrying and dumping a load, wherein said dump box has a rear edge defining an opening into said dump box, said rear edge having a channel being integrated therein, said channel extending around an entire perimeter of said opening defined by said rear edge, said channel having a bounding surface formed by said dump box, said bounding surface being smoothly and concavely arcuate with respect to said rear edge;

a gate being hingedly coupled to said dump box, said gate closing said dump box when said gate is positioned in a closed position, said gate opening said dump box when said gate is in an open position;

a conduit being integrated into said dump box, said conduit being fluidly coupled to an air compressor of the dump truck wherein said conduit is configured to receive compressed air from the air compressor;

a control being positioned in a cab of the dump truck wherein said control is configured to be accessible to a driver, said control being in electrical communication with the air compressor, said control actuating the air compressor to release compressed air into said conduit when said control is put into an on condition, said control inhibiting the air compressor from releasing compressed air into said conduit when said control is put into an off condition, said control facilitating air to escape said conduit when said control is put in said off condition; and a balloon being coupled to said dump box, said balloon being in fluid communication with said conduit, said balloon being inflated when said control is put in said on condition, said balloon engaging said gate when said balloon is inflated and said gate is in said closed position wherein said balloon is configured to inhibit debris from passing between said dump box and said gate, said balloon being deflated when said control is put into said off condition.

2. The assembly according to claim 1, wherein said gate has a first surface, said first surface abutting said rear edge of said dump box when said gate is in said closed position, said first surface being spaced from said rear edge when said gate is in said open position.

3. The assembly according to claim 1, wherein said conduit has a first end and a second end, said first end being fluidly coupled to an outlet of the air compressor, said second end being positioned in said channel.

4. The assembly according to claim 3, wherein said balloon is positioned in said channel, said balloon being coextensive with said channel, said balloon being fluidly coupled to said second end of said conduit for inflating said balloon with the compressed air supplied by the air compressor, said balloon engaging said first surface of said gate when said balloon is inflated and said gate is in said closed position.

5. An inflatable gate seal assembly being configured to seal a gate of a dump box on a dump truck when the gate is closed for inhibiting debris from exiting the dump box, said assembly comprising:

a dump box being mountable on a dump truck for carrying and dumping a load, said dump box having a rear edge defining an opening into said dump box, said rear edge having a channel being integrated therein, said channel extending around an entire perimeter of said opening defined by said rear edge, said channel having a bounding surface formed by said dump box, said bounding surface being smoothly and concavely arcuate with respect to said rear edge;

a gate being hingedly coupled to said dump box, said gate closing said dump box when said gate is positioned in a closed position, said gate opening said dump box when said gate is in an open position, said gate having a first surface, said first surface abutting said rear edge of said dump box when said gate is in said closed position, said first surface being spaced from said rear edge when said gate is in said open position;

a conduit being integrated into said dump box, said conduit being fluidly coupled to an air compressor of the dump truck wherein said conduit is configured to receive compressed air from the air compressor, said conduit having a first end and a second end, said first end being fluidly coupled to an outlet of the air compressor, said second end being positioned in said channel;

a control being positioned in a cab of the dump truck wherein said control is configured to be accessible to a driver, said control being in electrical communication with the air compressor, said control actuating the air compressor to release compressed air into said conduit when said control is put into an on condition, said control inhibiting the air compressor from releasing compressed air into said conduit when said control is put into an off condition, said control facilitating air to escape said conduit when said control is put in said off condition; and a balloon being coupled to said dump box, said balloon being in fluid communication with said conduit, said balloon being inflated when said control is put in said on condition, said balloon engaging said gate when said balloon is inflated and said gate is in said closed position wherein said balloon is configured to inhibit debris from passing between said dump box and said gate, said balloon being positioned in said channel, said balloon being coextensive with said channel, said balloon being fluidly coupled to said second end of said conduit for inflating said balloon with the compressed air supplied by the air compressor, said balloon engaging said first surface of said gate when said balloon is inflated and said gate is in said closed position.

\* \* \* \* \*